Patented Sept. 7, 1937

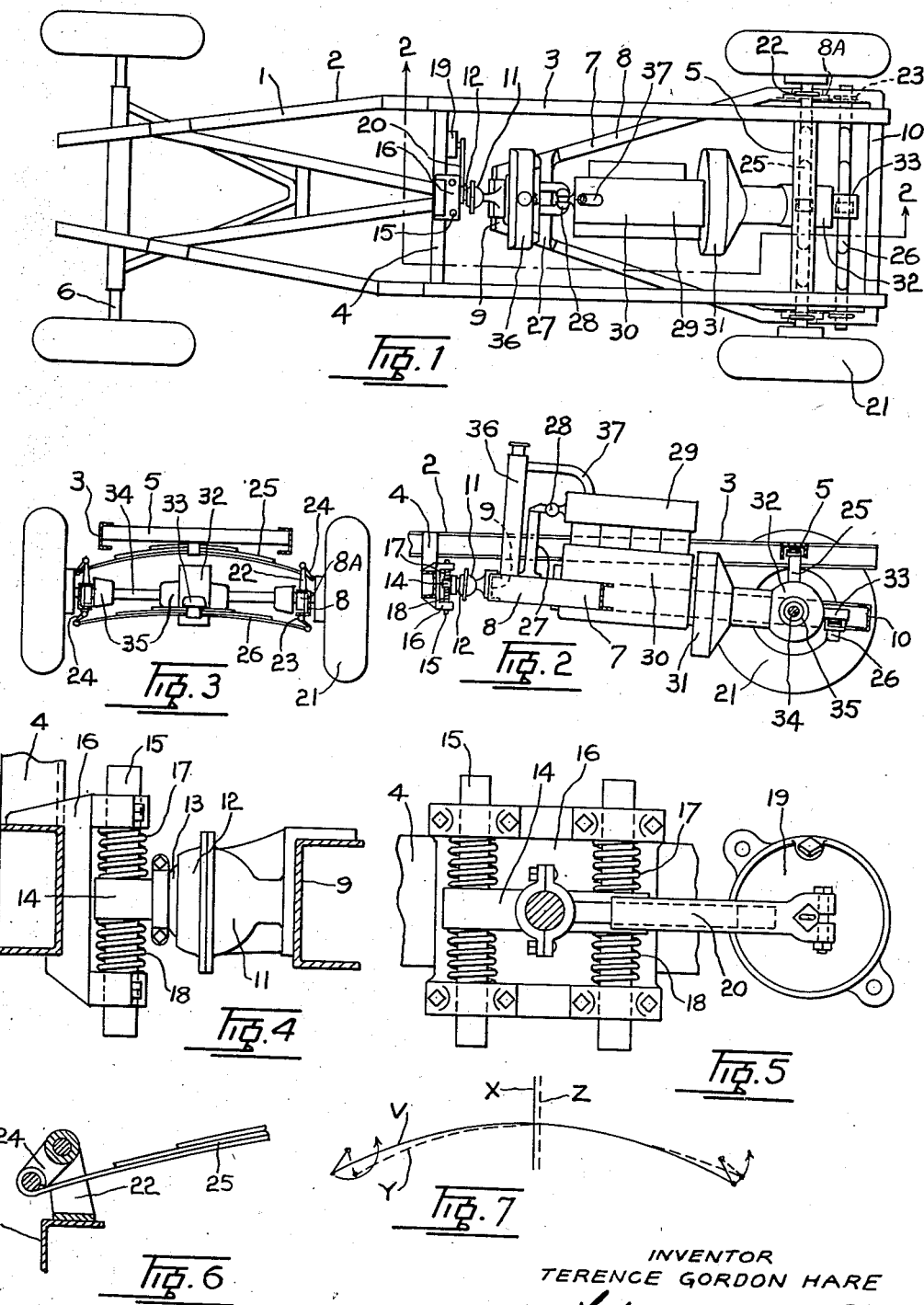

2,092,065

UNITED STATES PATENT OFFICE 2,092,065

AUTOMOBILE MOTOR SUSPENSION

Terence Gordon Hare, North Vancouver, British Columbia, Canada, assignor to T. G. Hare Company, Limited, Vancouver, British Columbia, Canada, a corporation Application July 31, 1935, Serial No. 34,081

4 Claims. (Cl. 180—57)

My invention relates to improvements in automobile motor suspension which is particularly adapted for passenger vehicles. The objects of the invention are to provide a suspension of the motor below the level of the car chassis; reduce the weight carried directly by the chassis; to lower the centre of gravity of the vehicle, and to reduce the body sway incidental to the turning of the vehicle at speed.

The invention consists essentially of a frame mounted upon front and rear axles and a sub-frame connected at one end to the frame and mounted at the other on the rear axle, said sub-frame being fitted with an engine for driving the rear axle, as will be more fully described in the following specification and shown in the accompanying drawing, in which:—

Fig. 1 is a plan view of the chassis.

Fig. 2 is a part sectional view of the rear end of the chassis taken on the line 2—2 of Figure 1.

Fig. 3 is a rear end view of the invention.

Fig. 4 is a side view of the sub-frame front suspension.

Fig. 5 is a rear view of same.

Fig. 6 is a general view of the transverse semi-elliptic spring mounting.

Fig. 7 is a diagrammatic view showing the function of said spring mounting.

In the drawing like characters of reference indicate corresponding parts in each figure.

The numeral 1 indicates a motor car chassis consisting of a frame 2 having side members 3 and transverse members 4 and 5. The front end of the frame 2 is spring mounted in any desired manner upon a front axle 6.

Disposed below the rear portion of the frame 2 is a sub-frame 7 having diverging side members 8, a front transverse member 9 and a rear transverse member 10. The front transverse member 9 of the sub-frame 7 is fitted with a ball cup 11 forming part of a universal joint 12, the ball of said joint being indicated by the numeral 13. This ball extends from a crosshead 14, see Figures 4 and 5, which is mounted upon a pair of vertical sliding rods 15 slidably carried in a bracket 16 secured to the transverse member 4 of the frame 2. The cross head is resiliently held between upper and lower springs 17 and 18 respectively, which abut the bracket 16 at their outer ends.

A snubber 19 of any suitable type is preferably mounted upon the transverse member 4 and is connected by a telescopic arm 20 to the crosshead 14 to reduce shock.

Adjacent the rear end of the diverging side members 8 wheel journals 8A are secured upon which rear wheels 21 are rotatably mounted. Two pairs of spring hangers respectively numbered 22 and 23 are secured to the side members 8 of the sub-frame 7. From the hangers 22 shackles 24 are slung, which shackles carry a transverse spring 25 mounted upon the underside of the transverse member 5 of the frame 2. The spring hangers 23 are fitted with similar shackles 24 which connect with the ends of a further transverse spring 26. Each of the springs 25 and 26 are longer than the space between their respective hangers and their shackles are normally inclined with their lower ends pointing away from the centre of the spring they support, so that when the weight supported by the spring, such as the body, is urged laterally by centrifugal force, as when the car is being driven around a curve, the end of the spring towards the axis of the curve is lowered and the end away from the axis is raised, with the consequence that outward sway of the spring supported weight from the vertical is either prevented or minimized, as will be seen from the diagram figure 7. In this diagram the curve V represents the spring in normal position, the vertical line X representing the vertical axis of the body, whereas the dotted line Y represents the spring when the car is turning and the dotted line Z the vertical axis of the body.

Extending upwards adjacent the forward end of the sub-frame 7 is a bracket 27 which is universally connected as at 28 to the front end of a power unit 29 consisting of an engine 30, transmission 31 and differential enclosed in the usual housing 32. The differential housing is provided with a lug 33 which is connected to the centre of the spring 26. The differential is coupled up to the wheels 21 by axles 34 provided at each end with suitably enclosed universals 35, so that the power unit may swing about its longitudinal axis, or may rise and fall according to the deflection of the spring 26 and transmit its power to the rear wheels 21 to drive them.

The radiator 36 will preferably be mounted upon the sub-frame 7 in front of the bracket 27 and will be coupled to the engine 30 with flexible hose 37 in the usual way.

It will be noticed that by this construction the power unit is spring mounted at its rear end, independently from the springing of the frame 2 and that the front end of said power unit is spring mounted from the frame 2 at a point intermediate the front and rear wheels. The frame 2 is entirely sprung from the front and rear axles, having only a portion of the power unit weight to support, and that weight being supported adjacent the longitudinal centre of the car it will be obvious that there will be materially less forward pitching of the vehicle than in the present type of engine mounting.

The power unit is entirely floating, so that no road shocks are transmitted to it except through the spring 26 at the rear and at the front through all the springs of the frame 2 and also the springs 17 and 18 abutting the crosshead 14.

What I claim as my invention is:

1. The combination with a motor vehicle frame, a pair of driving wheels and journals for said wheels, of a sub-frame pivotally supported adjacent one end to the motor vehicle frame and supported adjacent its opposite end from the wheel journals, a power unit consisting of an engine, a differential and a differential housing, the engine of said power unit being supported from the sub-frame, and the differential end of the power unit being spring mounted from the sub-frame adjacent the wheel journals, said differential being connected to the driving wheels by universally jointed live axles.

2. The combination with a motor vehicle frame, a pair of driving wheels and journals for said wheels, of a sub-frame pivotally supported adjacent one end to the motor vehicle frame and supported adjacent its opposite end from the wheel journals, a power unit consisting of an engine, a differential and a differential housing, the engine end of said unit being supported upon the sub-frame upon a pivot substantially in a vertical plane passing through the longitudinal axis of the power unit, and the differential end of the power unit being spring mounted from the sub-frame adjacent the wheel journals, said differential being connected to the driving wheels by universally jointed live axles.

3. The combination with a motor vehicle frame, a pair of driving wheels and journals for said wheels, of a sub-frame pivotally supported at one end from the motor vehicle frame and supported adjacent its opposite end from the journals of the driving wheels, a power unit carried by the sub-frame, said power unit consisting of an engine, a differential and a differential housing, the engine end of the power unit being carried by a universal joint and the differential end of said power unit being carried by spring means bearing upon the sub-frame adjacent the wheel journals and said differential being connected to the driving wheels by universally jointed live axles.

4. The combination with a motor vehicle frame, a pair of driving wheels and journals for said wheels, of a rigid U-shaped sub-frame pivotally supported at its base from the motor vehicle frame and supported adjacent its free ends from the driving wheel journals, a power unit consisting of an engine, a differential and a differential housing, universally jointed axles connecting the differential to the wheels to drive them, a transverse spring mounted from the free ends of the sub-frame for supporting the differential housing and a pivotal support between the engine end of the power unit and the sub-frame.

TERENCE GORDON HARE.